United States Patent
Kurosawa et al.

(10) Patent No.: US 7,698,725 B2
(45) Date of Patent: Apr. 13, 2010

(54) INFORMATION PROCESSING APPARATUS, INFORMATION PROCESSING METHOD AND ITS PROGRAM

(75) Inventors: Takahiro Kurosawa, Kunitachi (JP); Tomoaki Kawai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 975 days.

(21) Appl. No.: 11/345,991

(22) Filed: Feb. 2, 2006

(65) Prior Publication Data

US 2006/0179119 A1 Aug. 10, 2006

(30) Foreign Application Priority Data

Feb. 10, 2005 (JP) .............................. 2005-033958

(51) Int. Cl.
*H04N 7/173* (2006.01)
(52) U.S. Cl. ................ 725/105; 348/207.1; 348/207.11
(58) Field of Classification Search ........................ None
See application file for complete search history.

(56) References Cited

U.S. PATENT DOCUMENTS

| | | | |
|---|---|---|---|
| 6,349,324 B1 * | 2/2002 | Tokoro .................. 709/200 |
| 6,490,728 B1 * | 12/2002 | Kitazato et al. ............. 725/151 |
| 6,529,234 B2 * | 3/2003 | Urisaka et al. .......... 348/211.99 |
| 6,772,191 B1 * | 8/2004 | Kurosawa et al. ........... 709/203 |
| 6,845,106 B2 * | 1/2005 | McKinnon et al. .......... 370/477 |
| 6,901,448 B2 * | 5/2005 | Zhu et al. .................... 709/228 |
| 6,954,859 B1 * | 10/2005 | Simerly et al. .................. 726/3 |
| 2001/0024233 A1 * | 9/2001 | Urisaka et al. .............. 348/213 |
| 2003/0091239 A1 * | 5/2003 | Imagawa et al. ............. 382/232 |
| 2006/0179119 A1 * | 8/2006 | Kurosawa et al. ........... 709/217 |
| 2008/0055422 A1 * | 3/2008 | Takayama ................ 348/211.8 |

\* cited by examiner

*Primary Examiner*—David L Ometz
*Assistant Examiner*—Angel L Garces-Rivera
(74) *Attorney, Agent, or Firm*—Cowan, Liebowitz & Latman, P.C.

(57) ABSTRACT

An information processing apparatus arranged to refer to image capture limitation information to judge whether an image capture range after control includes a limitation area, the image capture limitation information defining the limitation area corresponding to an attribute of a user of a terminal, and effect control so that if it is judged that the image capture range includes the limitation area, the terminal is controlled so as to perform secure communications.

3 Claims, 13 Drawing Sheets

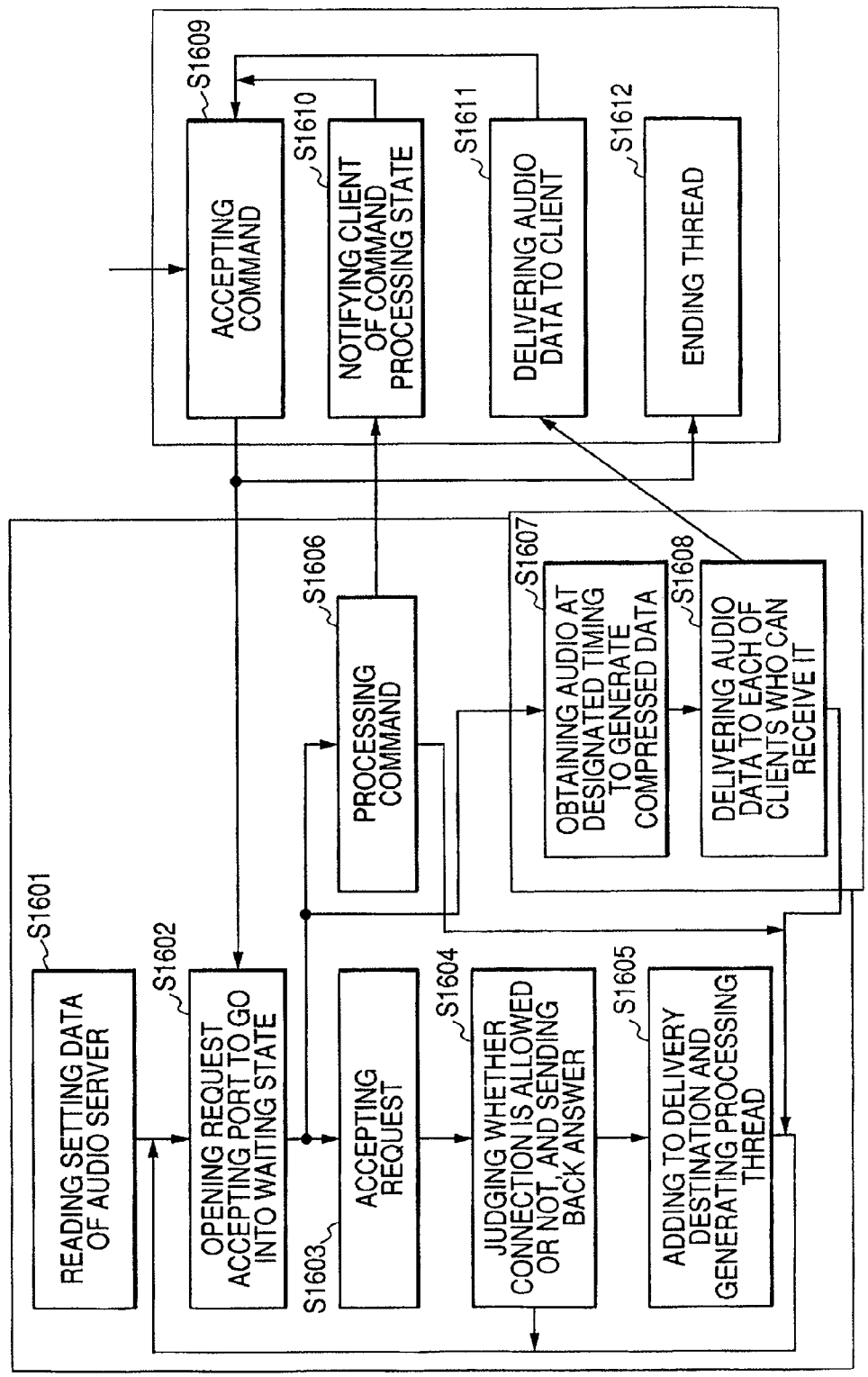

INFORMATION PROCESSING APPARATUS, INFORMATION PROCESSING METHOD AND ITS PROGRAM

BACKGROUND OF THE INVENTION

1. Field of the Invention

The present invention relates to an information processing apparatus for distributing images photographed with an image capture apparatus to terminals on a network.

2. Related Background Art

Live Video Communication System:

Techniques are known by which images photographed with a camera are distributed via communication infrastructures such as the internet, and techniques are also known by which camera settings and operations for photographing are instructed. Products applying these techniques are sold, such as a video distribution system WebView/Livescope by Canon Inc. There are other products of Canon Inc. such as live network camera servers VB101 and VB150 and a network camera VB-C10.

The video distribution system utilizing the above-described product can provide camera control such as pan, tilt, zoom and rear light correction as well as video distribution via a network. This system is provided with an access control function and can limit camera control and video distribution in accordance with an access privilege of each user.

This system can further limit an area to be photographed under camera control. For example, although a privileged user can use all zoom functions equipped to the camera, a general user is limited to be able to use only some of zoom functions (e.g., tele edge cannot be used to a full extent). Such limitation is applied also to a pan function and a tilt function. The live network camera servers VB101 and VB150 can distribute a plurality of source camera images via a network.

Encryption Techniques/Authentication Techniques:

A method is known by which data can be transmitted and received secretly or safely by using an encryption algorithm. Generally, encryption algorithms are classified into a symmetrical key scheme using same key information as an encryption key and a decryption key and an asymmetrical key scheme using different key information as an encryption key and a decryption key. The former scheme uses the Data Encryption Standard (DES), the Advanced Encryption Standard (AES), the Rivest's Cipher 4 (RC4) and the like. The latter scheme uses the Rivest Shamir Adleman (RSA) scheme and the like. By using an asymmetrical encryption scheme (public key encryption scheme), it is possible to confirm validity of an electronic signature added to document information.

Secure Communication Techniques:

There is technology called the Secure Socket Layer (SSL) as a protocol for providing safety of communications such as Web accesses by HTTP. This technology is mounted on a large amount of software typically browser software. SSL is positioned at an upper level of TCP/IP and at a lower level of an application protocol such as HTTP and FTP, and provides functions of server authentication, communication data encryption and client authentication (optional).

A scheme of providing safety of wireless communications is defined by WAP Forum. This scheme provides Wireless Transport Layer Security (WTLS) which is part of the Wireless Application Protocol (WAP). The scheme is designed on the basis of SSL and provides functions generally similar to those of SSL, such as data integrity, encryption and terminal authentication.

A Challenge-Handshake Authentication Protocol (CHAP) scheme defined as RFC1334 is known as a method of providing a communication authentication function. This scheme is mainly used by the Point-to-Point Protocol (PPP) defined as RFC1661.

A method of securing communication safety at an IP level is also defined in the Internet Protocol version 6 (IPv6). For example, there are the Authentication Header (AH) for packet authentication, the Encapsulating Security Payload (ESP) also for encryption and the like. This technology is not limited to IPv6, but there is similar technology for the Internet Protocol version 4 (IPv4). These technologies are adopted in many Virtual Private Networks (VPN) products. VPN is used as a substitute for a private line incurring a large cost.

Wide Angle Optical Camera Techniques:

Image capture apparatus are in use which utilize a wide angle optical system such as a fisheye lens and an omnidirectional mirror. Products of these image capture apparatus include a Sharp omnidirectional camera unit of Sharp Semiconductor Corporation and a PAL-mieru camera of Tateyama Machine Co. Ltd. Many additional values can be provided by adopting such image capture apparatus as a network camera or network camera server. Typically, image taken at various angles can be supplied to a plurality of users by applying an image conversion function and an image cut-out function to images (panorama images) photographed with a wide angle optical system. A wide angle combo camera is known which is used in combination with a camera (PTZ camera) capable of camera control such as pan, tilt and zoom. This camera can provide some users with high definition images under control of the PTZ camera, while general users are provided with images cut out from a panorama image.

Specifically, there is a technique capable of confirming easily a photographing range (Japanese Patent Application Laid-open No. H07-095547). There is also a technique capable of allowing many users to control cameras connected to a network, when necessary (Japanese Patent Application Laid-open No. H08-163422).

Camera control can be limited when offering services of video information of a network camera or camera server capable of camera control (pan, tilt and zoom, or camera exchange) on the Internet. For example, it is possible to set for general users a camera control area (prohibition area) limiting an area to be photographed under camera control, or a limited camera (prohibited camera). However, a manager or a privileged user can access the prohibition area or prohibited camera. It is therefore difficult to apply sufficient camera control limitation for general users accessing at the same time when the manager or the like accesses.

If general users are excluded when a manager or a privileged user accesses, usage convenience of video information services is degraded.

Application of secure communications to such a system does not progress currently because of mainly high cost.

SUMMARY OF THE INVENTION

An object of the present invention is to solve the above-described problems and provide an information processing apparatus, an information processing method and a program capable of performing limitations such as a prohibition area and a prohibited camera in accordance with each user attribute, without degrading usage convenience.

In order to achieve the object of the present invention, according to an embodiment of the present invention an information processing apparatus for distributing an image photographed with an image capture apparatus to a terminal of a network, comprises: an apparatus control unit for controlling an image capture range of the image capture apparatus in accordance with an instruction from the terminal requesting for distribution of the image; a storage unit for storing image capture limitation information defining an image capture limitation area corresponding to an attribute of a user of the terminal; and a communication control unit for controlling communications with the terminal, wherein if it is judged from the image capture limitation information stored in the storage unit that the image capture range after control by the apparatus control unit includes the limitation area, the communication control unit effects control so as to perform secure communications with the terminal.

BRIEF DESCRIPTION OF THE DRAWINGS

The above-described object of the present invention will become apparent from the accompanying drawings and the detailed description made in conjunction with the drawings.

FIG. 16 is a flow chart illustrating the operation of an audio server 506 in the camera server 101.

DETAINED DESCRIPTION OF PREFERRED EMBODIMENT

Embodiments of the present invention will be described in detail with reference to the accompanying drawings.

First Embodiment

Figure 1:
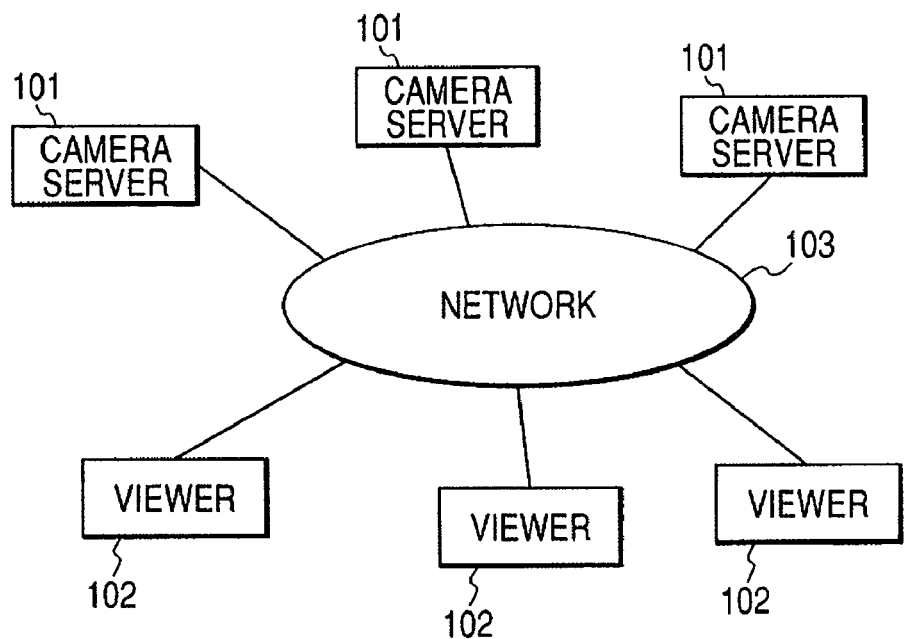
FIG. 1 is a schematic diagram showing an example of the configuration of an information processing network including camera servers (information processing apparatus) according to a first embodiment.

FIG. 1 is a schematic diagram showing an example of the configuration of an information processing network including camera servers (information processing apparatus) according to the first embodiment.

Referring to FIG. 1, a camera server 101 distributes video data captured with an image capture apparatus via a network 103. A viewer 102 is a computer terminal connectable to the network 103, and is a client terminal (video viewer) capable of viewing video data distributed by the camera server 101. As shown in FIG. 1, a plurality of camera servers 101 and viewers 102 are connected to the network 103. The network 103 shown in FIG. 1 may be an intranetwork running in an enterprise or organization or the Internet connected worldwide.

Next, brief description will be made on how video data is viewed through the viewer 102. First, the viewer 102 transmits a request (request for video data) to the camera server 101 via the network 103. If the camera server accepts this request, the camera server 101 distributes video data to the viewer 102 via the network 103. Upon reception of the distributed video data, the viewer 102 can display camera images. As the viewer 102 transmits a camera control command to the camera server 101, the camera server 101 controls an image capture apparatus in accordance with the camera control command, and the image capture apparatus effects zoom, pan, tilt, etc.

The camera server 101 can set a control prohibition area (or control prohibited camera). The camera server 101 receives a camera control request from the viewer 102 via the network 103. The camera server 101 judges whether the contents of the camera control request indicate a request for pan to the control prohibition area (or control prohibited camera). If it is judged that the request is a pan to the prohibition area (or prohibited camera), the camera server 101 automatically starts a transition process to secure communications with a camera server manager or privileged user.

In accordance with information (communication path designation, encryption request, etc.) on the secure communications requested by the camera server 101, the viewer 102 shifts to secure communications. As any one of viewers 102 shown in FIG. 1 succeeds a transition process to secure communications, the camera server 101 request other connected viewers 102 about the transition process to secure communications. If there is a viewer 102 unable to shift (a viewer 102 in use by a general user), this viewer 102 is disconnected. If any one of the viewers 102 cannot succeed the transition process to secure communications, the camera server 101 rejects the camera control request. The viewer 102 capable of shifting to secure communications is a viewer in use by a camera server manager or privileged user.

Figure 2:
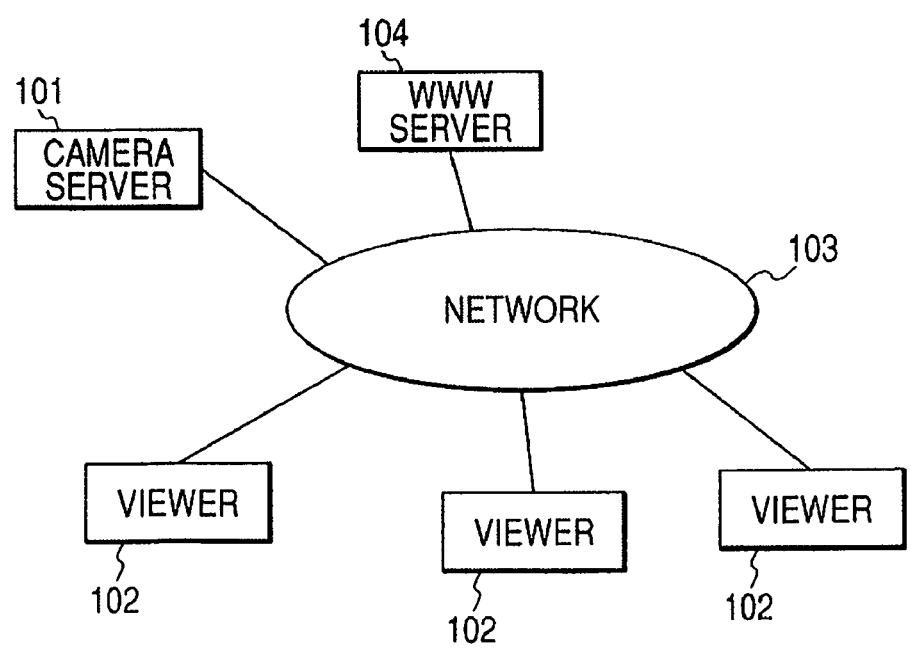
FIG. 2 is a diagram showing an example of the configuration of the information processing network shown in FIG. 1 and incorporating prevailed Web technologies.

The configuration of the information processing network including the camera servers 101 is not limited to that shown in FIG. 1, but the configuration such as shown in FIG. 2 may also be used. FIG. 2 is a diagram showing an example of the configuration incorporating prevailed Web technologies. A point greatly different from FIG. 1 resides in existence of a WWW server 104 connected to the network 103. Web page data managed in the WWW server 104 contains links representative of at which address each camera server 101 can be accessed. Therefore, the viewer 102 can easily connect a desired camera server 101 by accessing the Web page and clicking a corresponding desired link.

Next, description will be made on an example of the hardware structure of the camera server 101 of the embodiment shown in FIGS. 1 and 2.

Figure 3:
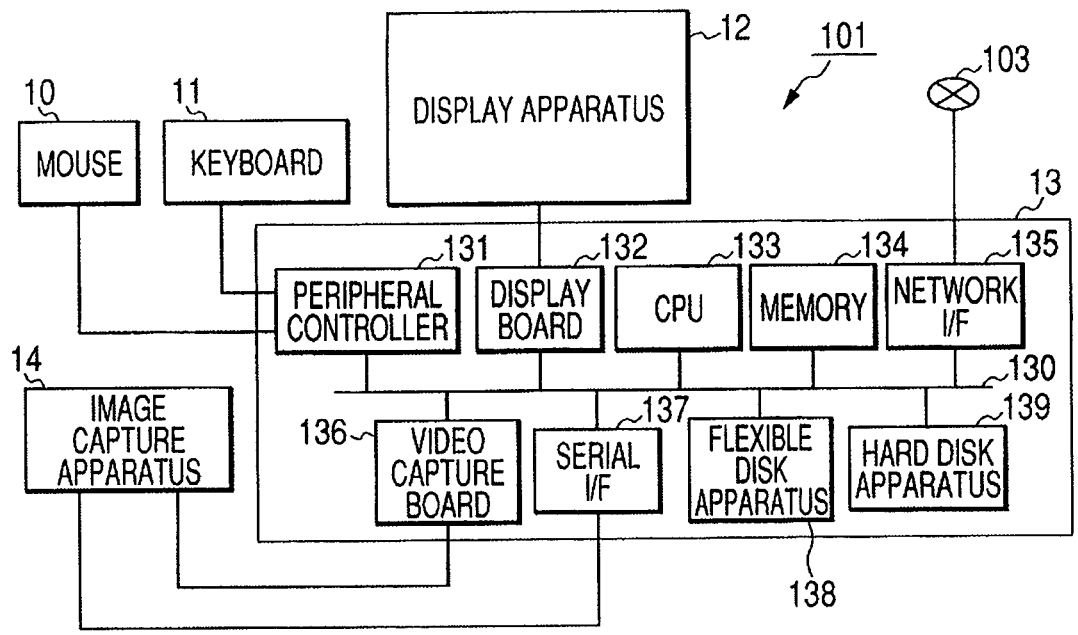
FIG. 3 is a diagram showing an example of a hardware structure of the camera server 101 of the embodiment shown in FIGS. 1 and 2.

FIG. 3 is a diagram showing an example of the hardware structure of the camera server 101 of the embodiment shown in FIGS. 1 and 2. As shown in FIG. 3, the camera server 101 is structured as a computer terminal equipped with an image capture apparatus 14 for actually photographing images. Specifically, the camera server 101 has a mouse 10 and a keyboard 11 as input devices, a display apparatus 12 as a display device, a computer main body 13 and the image capture apparatus 14.

A bus 130 in the computer main body 13 connects the following functional blocks. Namely, the bus 130 connects a peripheral controller 131 and a display board 132. The bus also connects a central processing unit (CPU) 133 realizing various functions by executing programs and a memory 134 for storing programs and functioning as a work area of CPU 133. The bus also connects a network I/F 135 for establishing connection to the network 103 and an image capture board 136 for acquiring video data from the image capture apparatus 14. The bus also connects a serial I/F 137 for transferring a control signal (command) and the like to/from the image capture apparatus 14, an FD apparatus 138 for accessing a flexible disk as a recording medium, and an HD apparatus 139 equipped with a hard disk (HD). In this embodiment, although the camera server 101 is structured including the image capture apparatus 14, the camera server 101 may be structured not including the image capture apparatus 14. For example, video data may be received from one or a plurality of externally installed image capture apparatus 14. The camera server 101 may be structured not including the mouse 10, keyboard 11, display apparatus 12, peripheral controller 131 and display board 132.

Next, description will be made on an example of the hardware structure of the viewer 102 of the embodiment shown in FIGS. 1 and 2.

Figure 4:
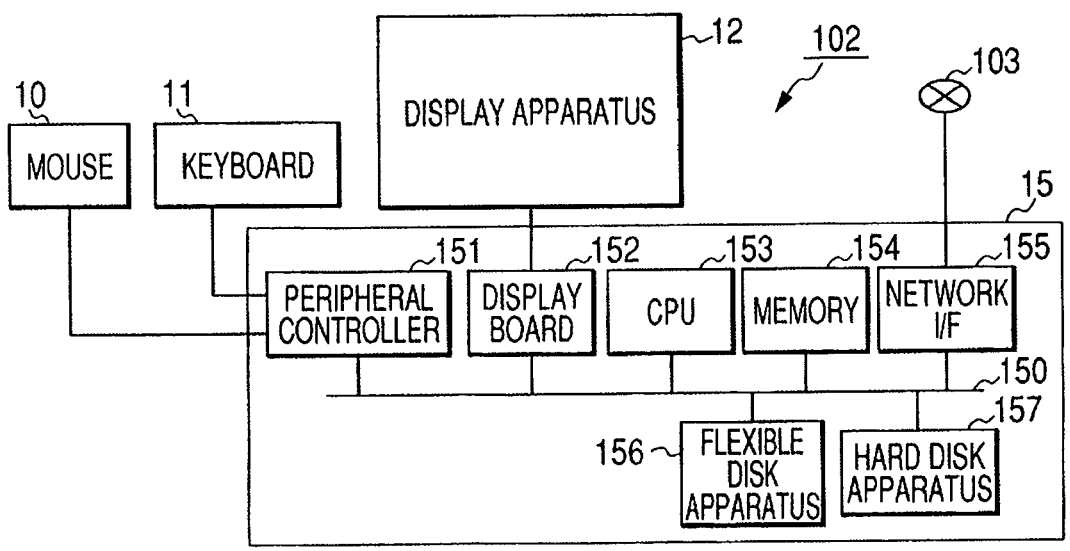
FIG. 4 is a diagram showing an example of a hardware structure of a viewer 102 of the embodiment shown in FIGS. 1 and 2.

FIG. 4 is a diagram showing an example of the hardware structure of the viewer 102 of the embodiment shown in FIGS. 1 and 2. As shown in FIG. 4, the viewer has a structure similar to that of a general computer and is equipped with a mouse 10, a keyboard 11 and a display apparatus 12, like the camera server 101 shown in FIG. 3. The structure of the computer main body 15 is generally similar to that of the computer main body 13 shown in FIG. 3. The structures of the components 151 to 155 are similar to those of the components 131 to 135 shown in FIG. 3, and the description thereof is omitted. The structures of the components 156 and 157 are similar to those of the components 138 and 139 shown in FIG. 3, and the description thereof is omitted.

Next, description will be made on the functional structures of the information processing network including the camera servers (information processing apparatus) 101 shown in FIG. 2.

Figure 5:
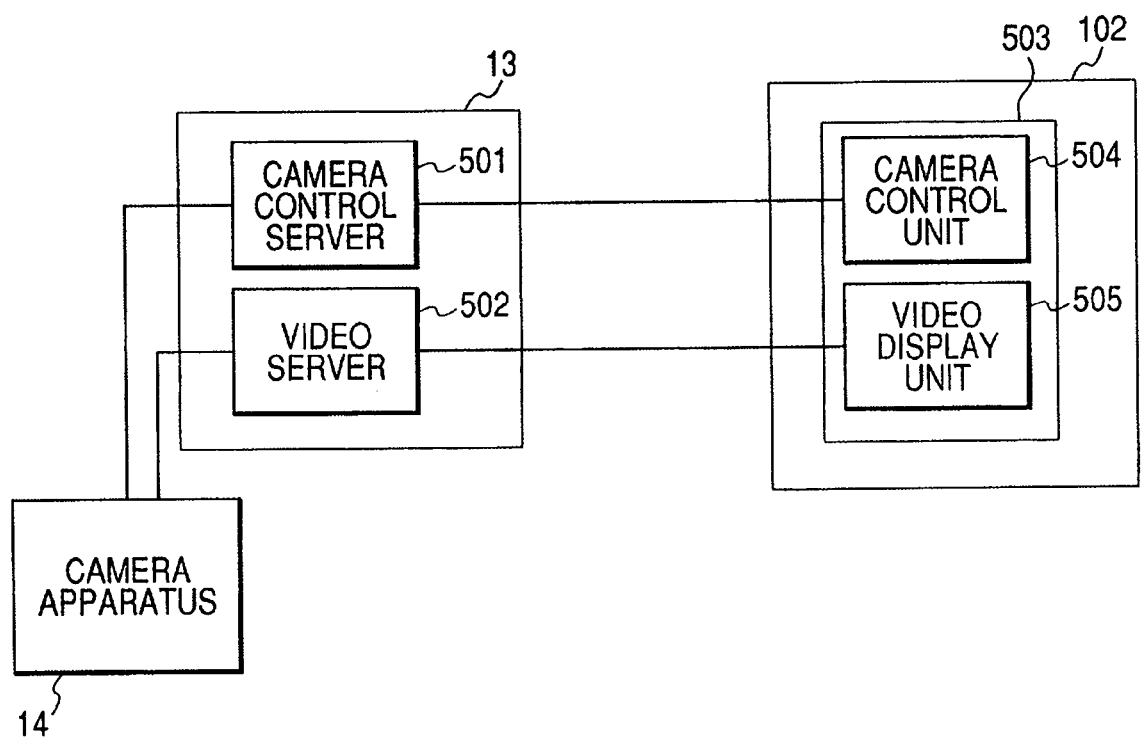
FIG. 5 is a schematic block diagram showing the functional structure realized by programs executed by the camera server 101 and viewer 102.

FIG. 5 is a schematic block diagram showing the functional structure to be realized by programs executed by the camera server 101 and viewer 102. As shown in FIG. 5, the computer main body 13 of the camera server 101 has the structure having two functional modules: a camera control server 501 for controlling the image capture apparatus 14 and a video server 502 for distributing video data. Similarly, a viewer unit 503 of the viewer 102 has the structure including a camera control unit 504 for dealing with control command and status notice for the image capture apparatus 14 and a video display unit 505 for dealing with display of video data from the image capture apparatus 14.

Next, description will be made on the operation of the viewer 102 on the information processing network including the camera servers 101 shown in FIG. 2.

Figure 6:
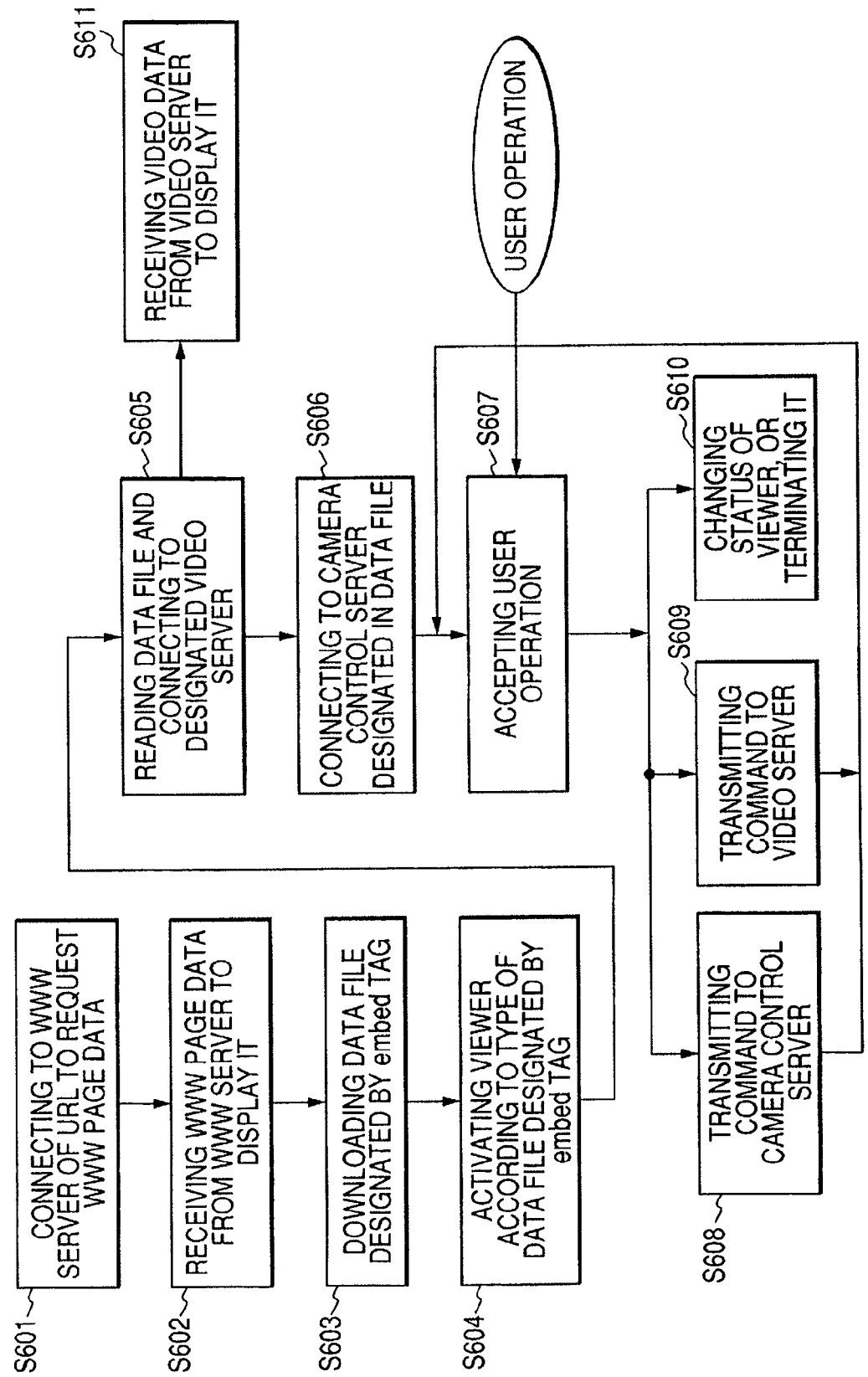
FIG. 6 is a diagram showing an operation flow of the viewer 102 shown in FIG. 2.

FIG. 6 is a flow chart illustrating the operation of the viewer 102 shown in FIG. 2. First, at Step S601 when a Web browser of the viewer 102 indicates a URL of the WWW server 104, the viewer 102 connects the WWW server 104 corresponding to URL. The viewer 102 requests for Web page data written in an HTML format.

Next, at Step S602 the viewer 102 receives the Web page data from the WWW server 104 and starts displaying the Web page data on the Web browser. The received page data contains the following embed tag or hyperlink. This tag or hyperlink indicates information for activating in the viewer 102 a viewer program realizing the viewer unit 503 shown in FIG. 5 and connecting the camera server 101.

<embed src="camera1.wvp" width=480 height=320>

Next, at Step S603 the viewer 102 downloads a data file ("camera1.wvp" file) designated by the embed tag, by accessing the WWW server 104. Next, at Step S604 the viewer 102 activates a program corresponding to an identifier of the data file, i.e., a viewer program. At Step S605 the viewer unit 503 of the viewer 102 reads the downloaded data file ("camera1.wvp file). The viewer connects the video server 502 in accordance with an address and connection port of the video server 502 in the camera server 101 written in the data file. At this time, an operation program (realized by activation of a thread or process) is activated for executing processes after the connection process. Upon activation of this program, at Step S611 the video display unit 505 repeats a process of receiving and displaying video data each time the video data is supplied from the video server 502 until the video display process is terminated by an instruction.

At Step S606 the viewer 503 further connects the camera control server 501. This connection is established in accordance with an address and connection port of the camera control server 501 written in the downloaded data file ("camera1.wvp" file). Next, the viewer unit 503 receives an operation request from a user and executes a loop process for performing camera control.

Specifically, at Step S607 the viewer unit 503 receives a user operation through a mouse or keyboard operation such as a menu operation and judges this operation an operation regarding camera control. If it is judged that the user operation is an operation regarding camera control, at Step S608 the camera control unit 504 transmits a control command to the camera control server 501. If it is judged that the user operation is an operation relative to the video server 502, at Step S609 the viewer unit 503 transmits a control command to the video server 502. If the user operation is an operation of changing (e.g., changing a display size) the status of the viewer unit 503, at Step S610 the viewer unit 503 updates the internal status. If a user operation is completed, programs regarding the operation of the viewer unit 503 are sequentially terminated. After the completion of the processes from Step S608 to Step S610, the flow returns to Step S607 to wait for a user operation input to constitute the loop process.

Description will be made on reception of a secure communication request ("secure connection required") as a response code from the camera control server 501 at Step S608. The viewer unit 503 establishes a encryption communication path using SSL to the camera control server 501, by using user information and password information (communication key information) stored in the viewer unit 503. After authentication of both communication partners through client authentication, a command having the same camera control contents is reissued. If the user information and password information is not stored in the viewer unit 503, an inquiry dialog is displayed on the display apparatus 12 to urge the user to input the user information and password information.

Next, description will be made on the operation of the camera server 101 shown in FIG. 2.

Figure 7:
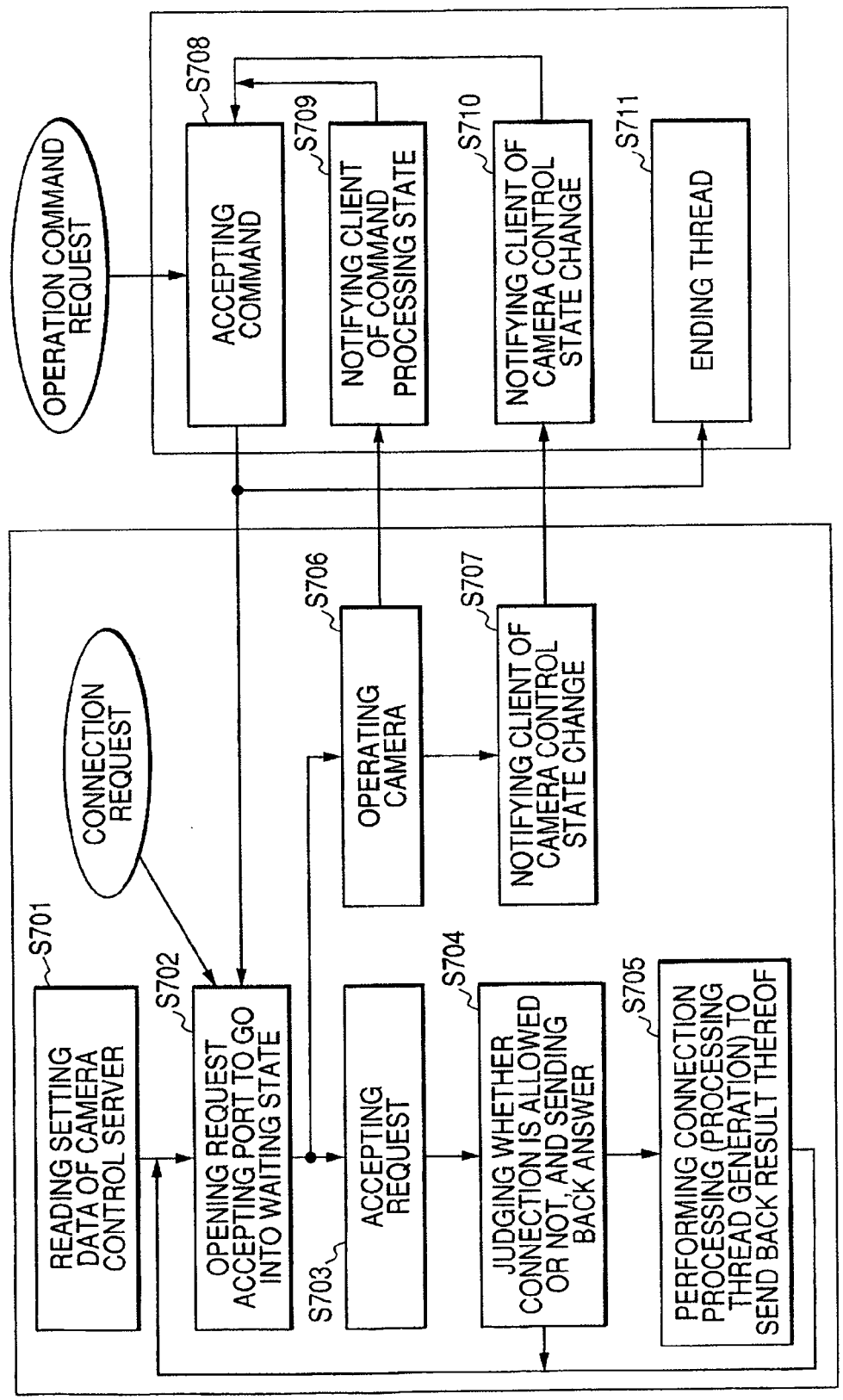
FIG. 7 is a flow chart illustrating the operation of a camera control server 501 in the camera server 101 shown in FIG. 2.

FIG. 7 is a flow chart illustrating the operation of the camera control server 501 in the camera server 101. First, at the activation stage at Step S701 the camera control server 501 reads operation setting information of the camera control server 501 from a particular file and starts operation in accordance with the operation setting information. The particular file is a system database such as registry depending upon OS.

Next, at Step S702 the camera control server 501 opens a port for receiving a request from the viewer unit 503 of the client terminal viewer 102. The camera control server 501 therefore enters a state for receiving a request from the viewer unit 503. Upon reception of a connection request from the viewer unit 503, at Step S703 the camera control unit 501 accepts the connection request.

Next, at Step S704 the camera control server 501 judges whether a connection process corresponding to the connection request is allowed or not. If judgment is rejection, an error code representative of connection rejection is sent back to the viewer unit 503 to thereafter return to Step S702. If judgment is permission, at Step S705 the camera control unit 501 generates, as a connection process, a thread for executing a process of receiving a command from the viewer unit 503. After the camera control server 501 registers the viewer unit 503, the flow returns to Step S702. At Step S708 the thread generated at Step S705 receives a command from the viewer unit 503.

If the command received by the thread is an operation command (command for controlling the image capture apparatus 14), the thread passes the operation command to a main program for executing an operation process of the image capture apparatus 14. The main program of the camera control server 501 receiving the operation command advances to Step S706 to control the image capture apparatus 14. Information representative of a control result (a code or the like indicating whether control of the image capture apparatus corresponding to the operation command succeeds or fails) is notified to the thread of the viewer 102 from which the operation command was transmitted. At Step S709 this thread of the viewer 102 sends the control results back to the viewer unit 503.

Next, at Step S707 the main program of the camera control server 501 acquires the status changed by the camera operation (e.g., values of pan, tilt and zoom) from the image capture apparatus 14 and notifies the status to threads of all connected viewers 102. At Step S710 the thread of each viewer 102 notifies a change in the camera control status to the viewer unit 503. If the thread of the viewer 102 receives a connection termination command from the viewer unit 503, the thread notifies the command to the main program of the camera control server 501, and at Step S711 the thread itself is terminated.

In dealing with the operation command, an assignment request for a camera operation privilege may be requested prior to issuance of a particular operation command. This eliminates disturbances under the state that a plurality of users request for camera operations. In this case, first, the viewer unit 503 transmits a request command for camera operation privilege acquisition to the camera control server 501. The camera control server 501 selects rejection, assignment or wait-for-one's-turn from the current assignment state of camera control privilege, and sends the selected one back to the viewer unit 103. The camera control privilege is robbed (limited) at a shorter time between a preset particular time and a time when the viewer unit 503 disconnects, and assigned to the next waiting user. The number of waiting users is limited to a preset number (e.g., five users), and a request larger than the preset number is rejected. The viewer 102 issues the operation command only during the period from a time when the camera control privilege is acquired to a time when the camera control privilege is robbed. The camera control server 501 accepts the operation command only from the viewer 102 assigned the camera control privilege.

Figure 12:
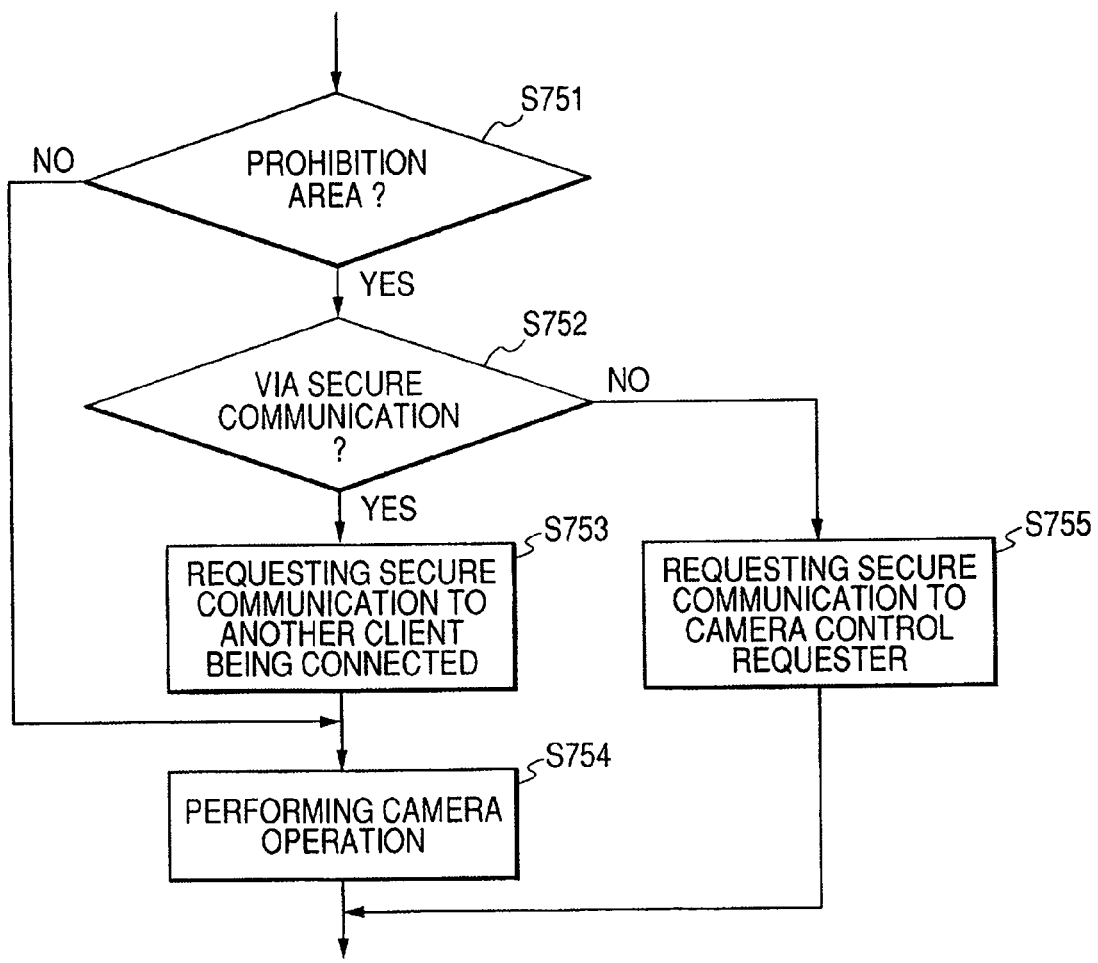
FIG. 12 is a diagram illustrating an example of a camera control limitation area (prohibition area) process.

In the control process at Step S706 for the image capture apparatus 14 corresponding to the operation command, the main program of the camera control server 501 executes a process regarding the camera control limitation area (prohibition area) prior to controlling the image capture apparatus 14. FIG. 12 is a diagram showing an example of the process regarding the camera control limitation area (prohibition area).

First, at Step S751 the main program of the camera control server 501 judges whether a photographing area of the image capture apparatus 14 invades the prohibition area if the received operation command is executed, or whether the camera is switched to a prohibited camera. In the case of neither invasion of the prohibition area nor the prohibited camera, the flow advances to Step S754. The prohibited camera is an image capture apparatus permitted to be accessed only by a camera server manager or privileged user, among a plurality of image capture apparatus managed by the camera server 101 on the assumption that the camera server 101 has a plurality of image capture apparatus.

If it is judged that the operation command is directed to the prohibition area or prohibited camera, the flow advances to Step S752. The main program of the camera control server 501 confirms whether the communication path received by the operation command is the secure communication path established for the manager or user registered as a privileged user. The secure communication path is an encryption communication path using SSL under client authentication.

Next, the flow advances to Step S753 if it is confirmed that the operation command is a control command from the manager or user registered as a privileged user via the secure communication path. The main program of the camera control server 501 issues a secure communication request ("secure connection required") to all connected viewers 102 other than the viewer 102 which is the operation command issuer. After this request is issued, the camera control server 501 disconnects communication paths other than the encryption communication path using SSL. Next, at Step S754 the main program of the camera control server 501 executes control (camera operation) for the image capture apparatus 14 corresponding to the operation command.

If it is confirmed at Step S752 that communications are not secure communications or a communication partner is not registered as a manager or privileged user, the flow branches to Step S755. The main program of the camera control server 501 sends a response code representative of the secure communication request ("secure connection required") back to the viewer 102 which is the operation command issuer.

Next, description will be made on the operation of the video server 502 in the camera server 101.

Figure 8:
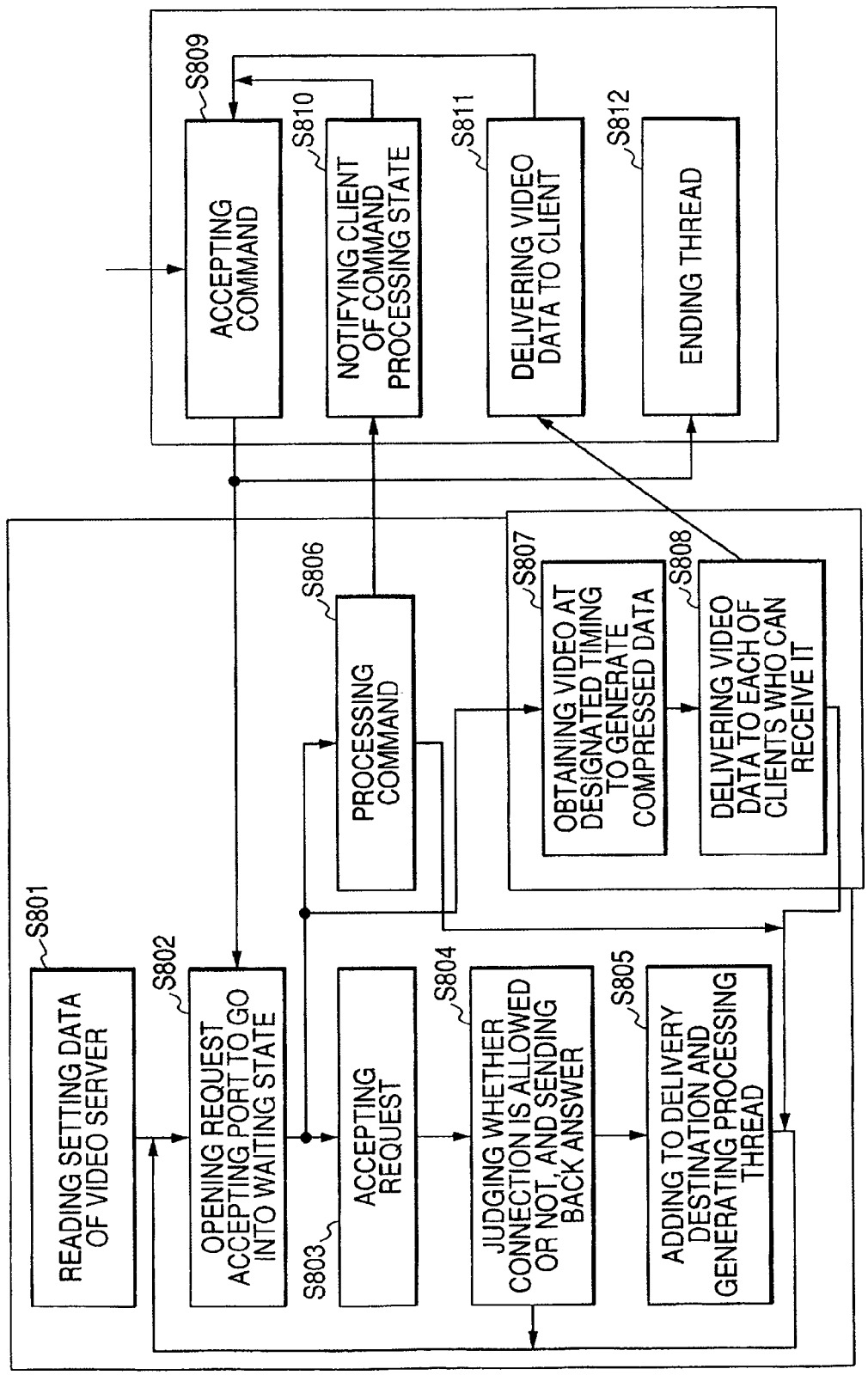
FIG. 8 is a flow chart illustrating the operation of a video server 502 in the camera server 101.

FIG. 8 is a flow chart illustrating the operation of the video server 502 in the camera server 101. First, at the activation stage at Step S801 the video server 502 reads operation setting information of the video server from a particular file (system database such as registry depending upon an OS) and starts operating in accordance with the operation setting information. Next, at Step S802 the video server 502 generates a thread (initially this thread is in a suspended state) for image acquisition and encoding. The video server 502 opens a port for receiving a request (connection request or command request) from the client viewer unit 503 to enter a request reception state.

If the request is accepted, the video server 502 departs from Step S802, and if the accepted request is a connection request, at Step S803 the video server 502 accepts the connection request. Next, at Step S804 the video server 502 judges whether connection is permitted for the accepted connection request. If connection is not permitted, the video server 502 sends an error code representative of connection rejection back to the viewer unit 503 to thereafter return to Step S802. If connection is to be permitted, at Step S805 the video server 502 generates, as a connection process, a thread for a process of receiving a command from the client viewer unit 503, and registers the client. In this case, if the thread for image acquisition and encoding is in the suspended state, an operation start is instructed to thereafter return to Step S802.

At Step S809 the thread for the client generated at Step S805 receives a command from the client (viewer unit 503). If an operation command arrives, the thread for the client accepts the operation command and passes the operation command to the main program of the video server 502 which executes a video process. Upon reception of the operation command at Step S802, the flow branches to Step S806 whereat in accordance with the operation command, the main program of the video server 502 performs an operation of changing settings of image acquisition, encoding, transmission and the like, and sends the result (code representative of the operation success or failure) back to the thread for the client received the command request. At Step S810 the thread for the client, which received the result sends the result back to the viewer unit 503 of the client.

Next, at Step S807 the main program of the video server 502 generates video data. Namely, as the operation of the thread for image acquisition and encoding generated at Step S805 starts, video data is acquired by using a video capture board at a preset time interval, and converted into compressed data. Next, at Step S808 the main program of the video server 502 sends the compressed data generated at Step S807 to the threads for all clients.

The thread for each client judges from a video frame transmission request flag whether a next video frame transmission request is received from the viewer unit 503 of each client. If it is judged that the next video frame transmission request command is received (if the video frame transmission request flag is set), at Step S811 the thread for the client distributes the compressed data to the viewer unit 503 of each client.

If the next video frame transmission request is received from the client viewer unit 503 at Step S809, the thread for the client sets the video frame transmission request flag. Generally, the next video frame transmission request command is sent back in response to reception completion of the compressed image data at the client viewer unit 503. Upon reception of a connection termination command from the client viewer unit 503, this command is notified to the main program and the thread itself is terminated at Step S812.

Figure 9:
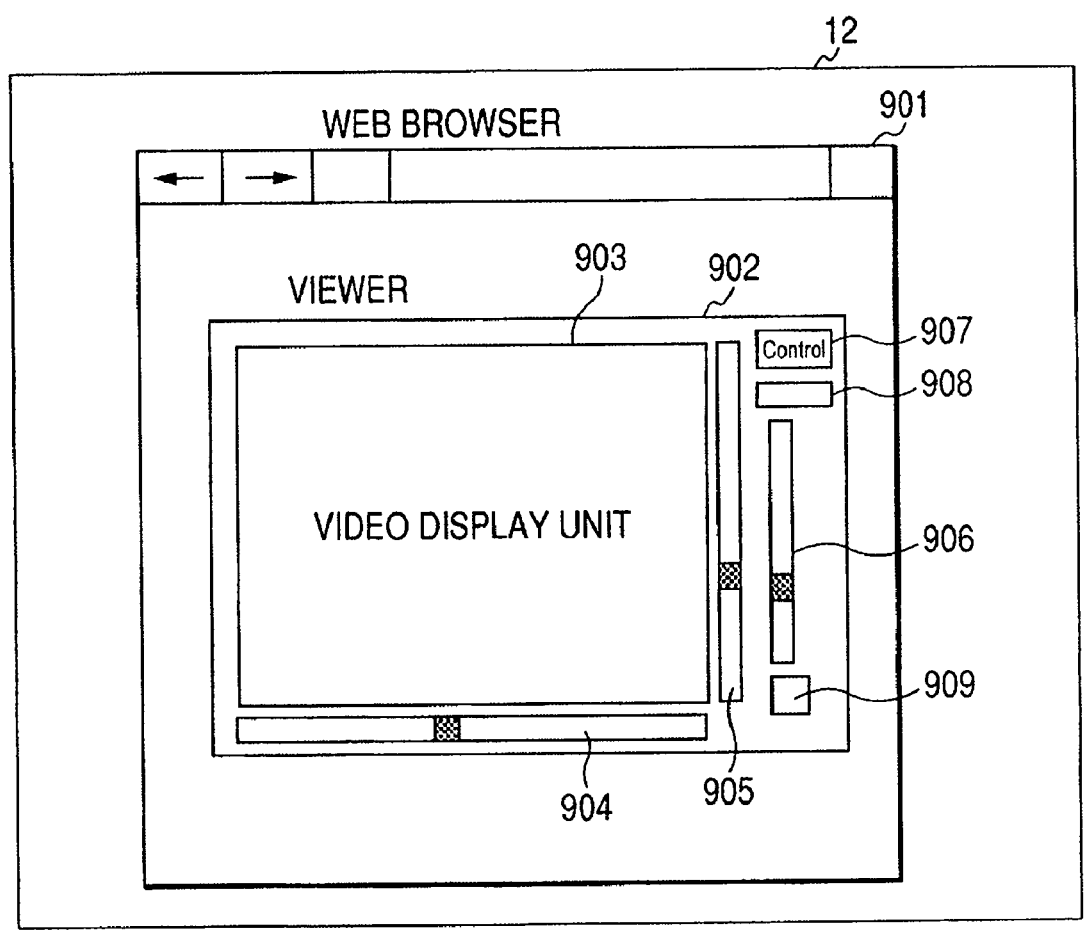
FIG. 9 is a diagram illustratively showing a screen of a display apparatus 12 of the viewer 102 while a viewer unit 503 of a client operates.

FIG. 9 is a diagram illustratively showing the state of a screen of the display apparatus 12 of the viewer 102 while the client viewer unit 503 operates. Reference numeral 901 denotes a Web browser screen which is displayed while CPU 133 executes a Web browser program. Reference numeral 902 denotes a viewer screen displayed in a display area of the Web browser 902 while CPU 133 executes a viewer program. Reference numeral 903 denotes a video display area of the viewer screen 902 in which images are displayed.

Reference numeral 904 denotes a scroll bar for panning (lateral motion of the image capture apparatus 14) in the viewer screen 902. Reference numeral 905 denotes a scroll bar for tilting (vertical motion of the image capture apparatus 14) in the viewer screen 902. Reference numeral 906 denotes a scroll bar for zooming in the viewer screen 902. Reference numeral 907 denotes a button for requesting for a camera control privilege in the viewer screen 902. Reference numeral 908 denotes a display area for displaying the state of a camera control privilege in the viewer screen 902. Reference numeral 909 denotes a button for rear light correction in the viewer screen 902.

The viewer screen 902 shown in FIG. 9 is GUI of the viewer 102 for user operations illustrated in FIG. 6, and the video data received at Step S611 is displayed in the video display area 903. Camera operation instructions from the scroll bars 904 to 906 and buttons 907 and 908 are received at Step S607 of FIG. 6, and processed at Steps S608 to S610 of FIG. 6 to send the operation commands to the camera control server 501 and the like.

Figure 10:
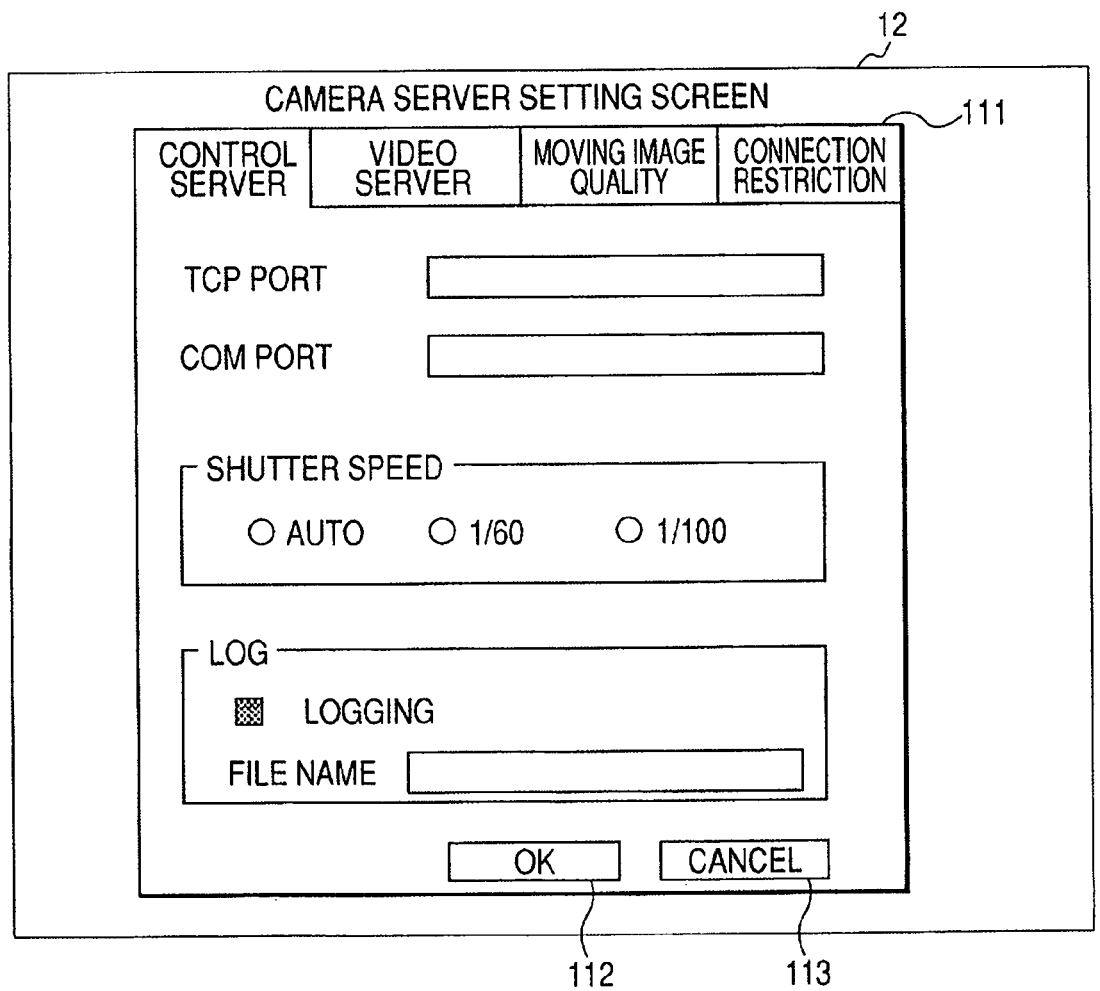
FIG. 10 is a diagram showing an example of a setting screen for operation setting information representative of values to be used by the camera server 101.

FIG. 10 is a diagram showing an example of a screen for setting operation information on the camera server 101. Namely, FIG. 10 shows an example of the screen for setting operation information to a particular file, which information is read by the camera control server 501 and video server 502 at Step S801 of FIG. 8 and at Step S901 of FIG. 9. The particular file is a system database such as registry depending upon OS. As shown in FIG. 10, the camera control server 501 and video server 502 can set various parameters (to be described later) of moving image quality, connection limitation items and the like on a setting screen 111. As a user depresses an OK button 112 of the setting screen 111, the camera server 101 executes a process of writing values set on the setting screen 111 into a particular file or registry. As a user depresses a cancel button 113 of the setting screen 111, the process is terminated without writing set values.

Figure 11:
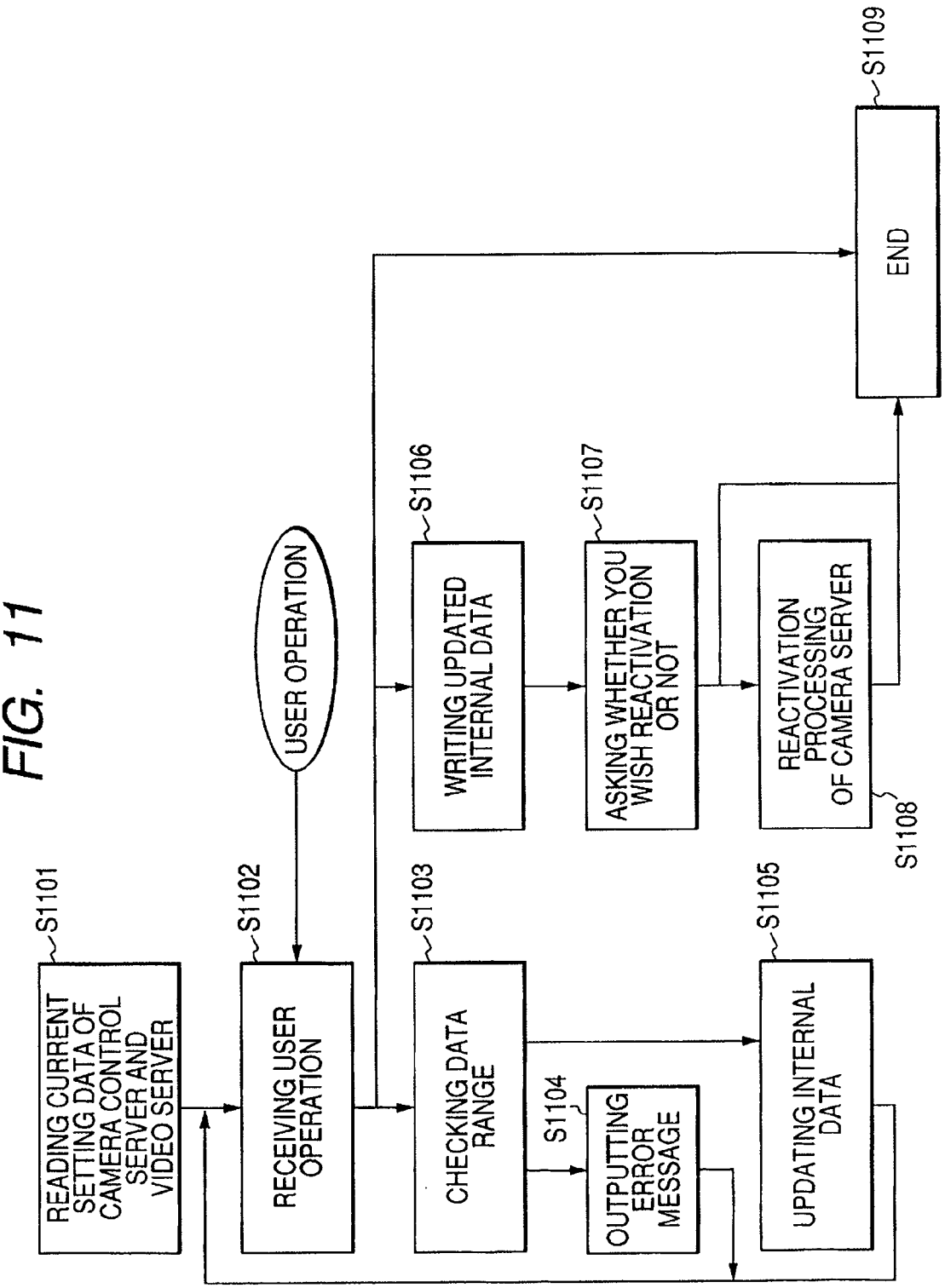
FIG. 11 is a flow chart illustrating the operation of a setting screen 111 of the camera server 101 shown in FIG. 10.

FIG. 11 is a flow chart illustrating the operation to be performed by the camera server 101 on the setting screen 111 shown in FIG. 10. First, at the activation stage of the setting screen 111 at Step S1101 the camera server 101 reads setting information of the camera control server 501 and video server 502 stored in a particular file, sets the read setting information to internal data and displays the setting information on the setting screen 111. The particular file is a database such as registry depending upon OS. Thereafter, a loop is repeated for receiving and processing an operation input to the setting screen 111 by a user.

Specifically, at Step S1102 the camera server 101 waits for an input of a user operation, and if there is an input, receives the input. Next, at Step S1103 the camera server 101 judges whether the value input by the user is in a proper range. If it is judged that the input value is out of the proper range, the flow advances to Step S1104 whereat the camera server 101 outputs an error message, and clears the value to thereafter return to Step S1102 for waiting a user input. If it is judged that the input value is in the proper range, the flow advances to Step S1105 whereat the camera server 101 updates the internal data to the input value to thereafter return to Step S1102.

There are the following items for the value settable to the setting screen 111. The items include a TCP port number for camera control communications, the number of a COM port (serial) for connection to a camera, a shutter speed, a presence/absence of log information regarding camera control, and a log file name. The items also include a TCP port number for video data communications, a presence/absence of log information, a log file name, a frame rate for defining a time interval of capturing images, a Q-Factor for determining compression quality, and a screen size of original data before compression. The items also include a longest connection time of one client viewer, the number of users waiting for a camera control privilege, a control privilege holding time occupied by one viewer, and the maximum number of clients connectable for video data and camera control.

If a user input is a depression of the OK button 112, the camera server 101 advances from Step S1102 to Step S1106 whereat the updated internal data is written in the particular file or the like for storing setting information on the camera control server 501 and video server 502. Next, at Step S1107 the camera server 101 displays a panel which inquires about whether the camera server 101 is reactivated or not in order to reflect the updated internal data. If the camera server 101 is to be reactivated, at Step S1108 the camera server 101 reactivates the camera control server 501 and video server 502. Next, at Step S1109 the camera server 101 terminates the setting program. If the camera server is not reactivated, the flow advances from Step S1107 directly to Step S1109 to terminate the setting program. If a user input to the setting screen 111 at Step S1102 is the cancel button 113, the flow advances from Step S1102 directly to Step S1109 to terminate the setting program.

As described above, in this embodiment the camera server 101 (or network camera) on the network 103 sets the control prohibition area (or control prohibited camera). Upon an event of a camera control request for the control prohibition area (or control prohibited camera), the camera server 101 can automatically start a transition process to secure communications with the manager or privileged user.

The characteristic point in particular resides in that the viewer (client) 102 shifts to the secure communications in accordance with the secure communication information (communication path designation, encryption request, etc.) requested by the camera server 101. Further, if any one of the viewers 102 succeeds the transition process to the secure communications, the other connected viewers 102 are requested to execute the transition process to the secure communications.

Accordingly, the viewers (clients used by general users) 102 unable to execute the transition process are disconnected. Conversely, if any one of the viewers 102 cannot succeed the transition process to the secure communications, the camera server 101 rejects the camera control request for the prohibition area or prohibited camera.

In the above-described embodiment, the secure communications transit upon an event of camera control to the prohibition area. The procedure of transition from the secure communications to ordinary communications when camera control departs from the prohibition area can be explained in a manner similar to that described above. In this case, in order to avoid frequent switch-over between the secure communications and ordinary communications, it may consider that the secure communications continue for a predetermined period.

In the above-described embodiment, although an encryption communication path using SSL is used as the secure communication path, the invention is not limited only to the encryption communication path at the transport level. As the encryption communication path, an encryption communication path at the network level may also be used, such as IPsec and IPv6. The encryption communications at the application level by a custom encryption scheme may also be used. It can be conceived easily to use a communication path other than the encryption communication path as the secure communication path. For example, a secure communication request on the side of the camera server 101 may explicitly designate a different network medium such as a telephone line. This approach is effective for information services utilizing a mobile phone network.

It may further be considered that the secure communications may be realized by using communications via an accounting server. For example, a secure communication request on the side of the camera server 101 may explicitly designate billed communications via a designated billing server. The camera server 101 judges only whether communications are performed via the billing server. By using the functions of the billing server, this approach can reduce the cost for the camera server 101 itself to equip and maintain a user management function and an authentication function, and the cost for configuring an encryption communication path using SSL through client authentication. This approach can also be realized by requesting the client viewer 102 about certificate information ensuring payment of a corresponding value.

By adopting this approach, an operation system is possible not limiting to the camera server manager and privileged users. For example, an operation system can be realized in which the viewer of a user who paid a corresponding value is permitted to perform camera control to the control prohibition area (or prohibited camera).

Further, in the above-described embodiment, both the video data communications and camera control communications are collectively switched to the secure communications. Instead, only one type of the communications may be switched to the secure communications. For example, only the video data communications are switched to the secure communications. When images are distributed by the secure communications, it can be conceived easily that encryption at the application level utilizing the video data codec is used. A different secure communication method may be selected for each viewer (client) 102.

Furthermore, in the above-described embodiment, although the camera control server 501 judges camera control to the prohibition area and requests for switching to the secure communications, the invention is not limited thereto. For example, if there are many cases in which prohibition areas are set in a static manner, the prohibition area information set to the camera server 101 may be acquired when the viewer 102 is first connected. If the camera control of the viewer corresponds to the prohibition area at the same timing, the viewer 102 itself requests for the secure communications. In this case, the manager privilege and privileged user privilege are required for shift to the prohibition area and for secure communications, similar to the embodiment.

Second Embodiment

Similar to the first embodiment, in the second embodiment, the camera servers 101 (or network cameras) and viewers 102 are disposed on the network 103 as shown in FIGS. 1 and 2. In response to an event of a camera control request relative to the control prohibition area (or control prohibited camera) set to the camera server 101, the camera server 101 automatically starts the transition process to the secure communications with the manager or privileged user.

The second embodiment is characterized in that if a plurality of image capture apparatus 14 are connected to the same camera server 101, the communications are shifted to the secure communications in the unit of each image capture apparatus 14. This configuration is applicable to, for example, VB150 setting a plurality of source image inputs, and a camera server of the type that a wide angle optical video capture system and a PTZ camera are integrated. The embodiment is further characterized in that different video data is supplied to the viewer 102 unable to shift to the secure communications (viewer 102 of a general user). For example, video data is supplied by forcibly switching to a camera image (e.g., an image cut out from the wide angle optical image capture system) of another particular image capture apparatus 14 permitted to be connected to the same camera server 101.

In the second embodiment, the connection arrangement of the network 103 and the hardware structures and operations of the camera server 101 and viewer 102 are similar to those of the first embodiment. Namely, the connection arrangement and the hardware structures and operations are similar to the connection arrangement of the network 103 of the first embodiment, the structures of the camera server 101 and viewer 102 of the first embodiment and the operations of the software illustrated in FIGS. 6, 7, 8, 11 and 12. Different points from the first embodiment reside in that in the hardware structure of the camera server 101 shown in FIG. 3, a plurality of image capture apparatus 14 and video capture boards 136 are used and that a partial operation of the camera control server 501 illustrated in FIG. 12 is different.

Specifically, although not shown, the hardware structure of the camera server 101 of the second embodiment has a plurality of video capture boards 13. Namely, this structure of the camera server has a plurality of types of image capture apparatus each including a PTZ camera (image capture apparatus capable of camera control such as pan, tilt and zoom) and a wide angle optical image capture system (image capture apparatus capable of acquiring a panorama image).

In this embodiment, the camera control server 501 operates in the following manner at Step S753 shown in FIG. 12. At Step S753 the camera control server 501 issues a secure communication request ("secure connection required") to the client connected through communications other than the secure communications using SSL. After this request is issued, the camera control server 501 supplies different video data to the viewer 102 not shifting to the encryption communications using SSL. Namely, the camera control server 501 supplies video data by switching to a camera image of a particular image capture apparatus without camera control limitation in the same camera server 101.

Specifically, the camera image without camera control limitation is an image cut out from an image acquired by the wide angle image capture system (particular image capture apparatus) of the wide angle combo camera server (camera server integrating a wide angel optical image capture system and a PTZ camera). This image is obtained by subjecting an image acquired by the wide angle optical image capture system to image conversion and a partial cut-out process. When the PTZ camera enters the camera control limitation area (prohibition area), the camera server 101 automatically switches to a cut-out image of the image acquired by the wide angle optical image capture system and distributes the cut-out image to the viewer unable to shift to the secure communications. In this case, the camera control server 501 inherits the video distribution parameters (control parameters such as an image size and a frame rate) of the viewer 102 before image change, to the image from the particular image capture apparatus after image change.

With this arrangement, the camera server 101 can automatically start the transition process to the secure communications with the manager or privileged user, in response to an event of a camera control request. Further, this embodiment is characterized in that if a plurality of image capture apparatus 14 are connected to the same camera server 101, the camera server 101 judges whether communications are shifted to the secure communications in the unit of each image capture apparatus 14. Furthermore, different video data is supplied to the viewer 102 unable to shift to the secure communications (viewer 102 of a general user) by forcibly switching to a camera image of another particular image capture apparatus 14 permitted to be connected to the same camera server 101.

In this embodiment, although video data is switched to an image of another particular image capture apparatus 14 of the same camera server 101, an image to be switched may be an image supplied by another particular camera server 101. For example, an embodiment can easily conceived in which by setting information on connection to another particular camera server 101, an alternative image can be automatically switched to the viewer 102 unable to shift to the secure communications (viewer 102 of a general user). In this case, the video distribution parameters (control parameters such as an image size and a frame rate) of the viewer 102 may automatically be inherited to the switched camera server 101. Conversely, the video distribution parameters (such as an image size and a frame rate) may be degraded to supply an image of the same image capture apparatus. Namely, only an image of low resolution or only a still image may be supplied.

Third Embodiment

Similar to the first embodiment, in the third embodiment, the camera servers 101 (or network cameras) and viewers 102 are disposed on the network 103 as shown in FIGS. 1 and 2. For the video data distribution from the camera server 101, the camera server 101 automatically starts the transition process to the secure communications with the manager or privileged user. The third embodiment is characterized in that the control prohibition area is extended to audio data distribution and that in response to a start event of audio data distribution, the communications are shifted to the secure communications and the viewer 102 unable to shift to the secure communications is disconnected.

In the third embodiment, the connection arrangement of the network 103 and the hardware structures and operations of the camera server 101 and viewer 102 are similar to the connection arrangement of the network 103 of the first embodiment, the structures of the camera server 101 and viewer 102 of the first embodiment and the operations of the software illustrated in FIGS. 6, 7, 8, 11 and 12.

Figure 13:
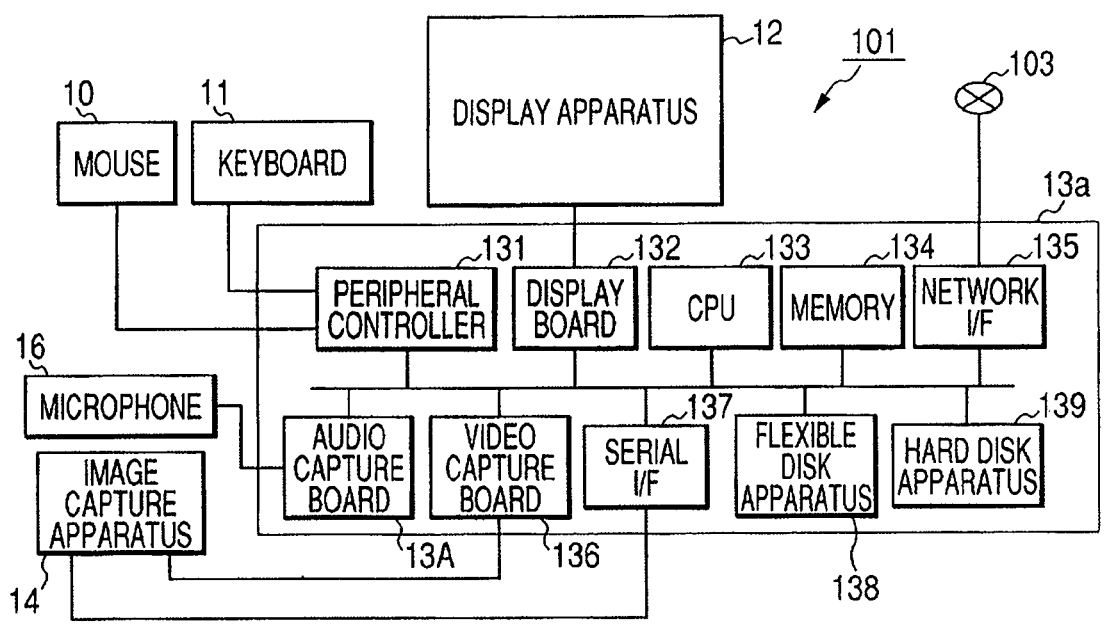
FIG. 13 is a diagram showing an example of the hardware structure of a camera server 101 according to a third embodiment.
Figure 14:
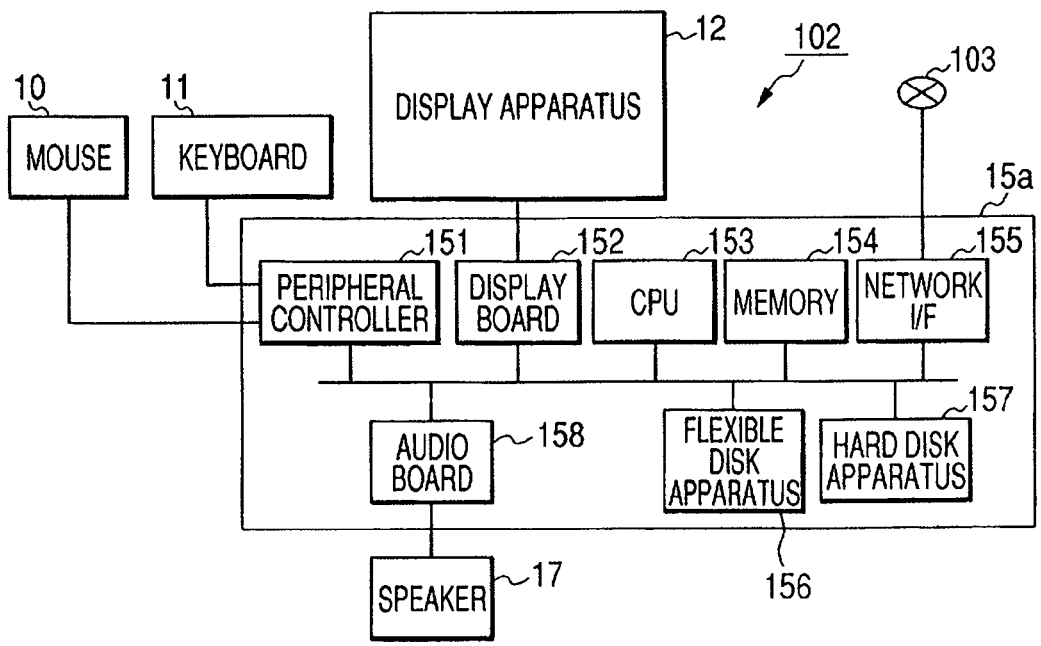
FIG. 14 is a diagram showing an example of the hardware structure of a viewer 102 according to the third embodiment.

FIGS. 13 and 14 are diagrams showing examples of the hardware structures of a camera server 101 and viewer 102 of the third embodiment. As shown in FIGS. 13 and 14 and compared to the hardware structures shown in FIGS. 3 and 4 of the first embodiment, the hardware structure of the camera server 101 of the third embodiment is different in that a microphone 16 and an audio capture board 13A are added for processing audio data, and the hardware structure of the viewer 102 is different in that a speaker 17 and an audio board 158 are added.

Figure 15:
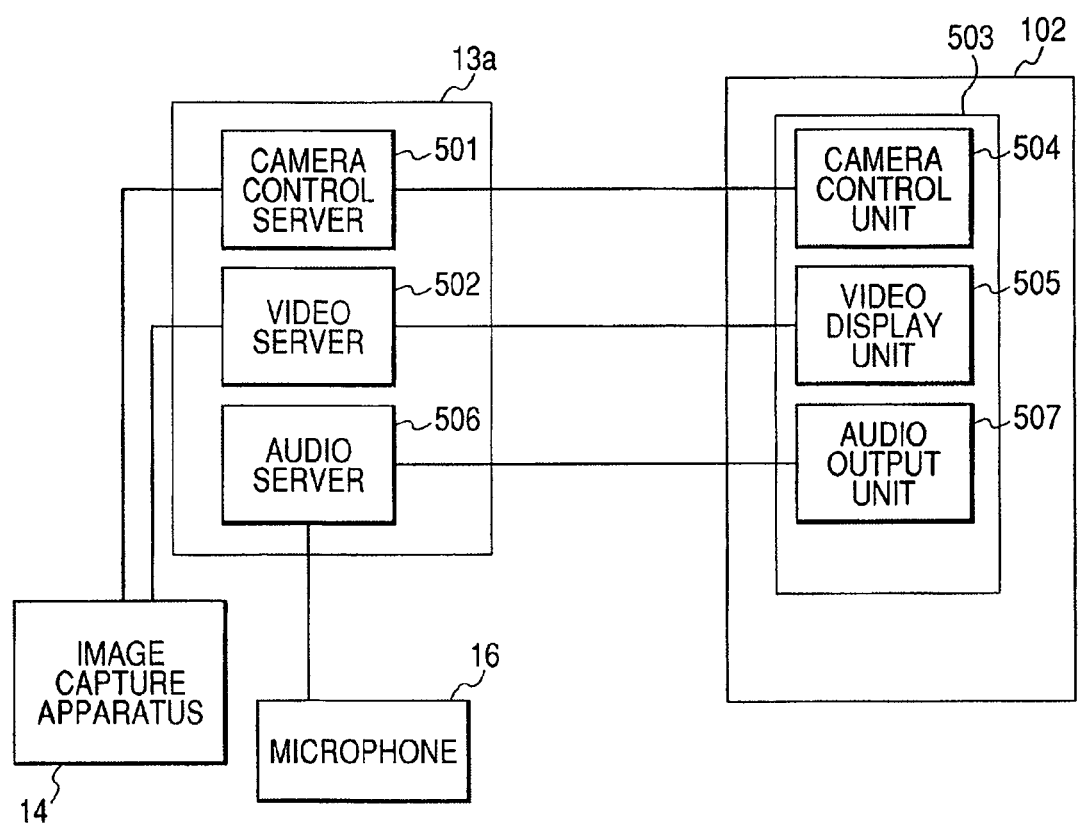
FIG. 15 is a schematic block diagram showing the functional structure of the camera server 101 and viewer 102 according to the third embodiment.

FIG. 15 is a schematic block diagram showing the functional structure of the camera server 101 and viewer 102 of the third embodiment. As shown in FIG. 15 and compared to the functional structure of the first embodiment shown in FIG. 5, the functional structure of the camera server 101 and viewer 102 of the third embodiment is different in that an audio server 506 and an audio output unit 507 are added.

The operation of the audio data server 506 is similar to an operation of processing video data by the video server 502 of the first embodiment illustrated in FIG. 8, with the video data being replaced with audio data. FIG. 16 is a flow chart illustrating the operation of the audio server 506 of the camera server 101. First, at the activation stage at Step S1601 the audio server 506 reads operation setting information of the audio server 506 from a particular file (system database such as registry depending upon OS) and starts operating in accordance with the operation setting information. The audio server 506 generates a thread (initially this thread is in a suspended state) for audio acquisition and encoding, and opens a port for receiving a request from the client viewer unit 503 to enter a request reception state at Step S1602. If a request (connection request or command request) is accepted, the audio server departs from Step S1602 and if the request is the connection request, this connection request is accepted at Step S1603. At Step S1604 it is judged whether connection is permitted. If connection is not permitted, an error code representative of connection rejection is sent back to thereafter return to Step S1602. If connection is to be permitted, at Step S1605 the audio server 506 generates, as a connection process, a thread (for the client) for receiving a command from the client viewer unit 102, and registers the client viewer 102. In this case, if the thread for audio acquisition and encoding is in the suspended state, an operation start is instructed to thereafter return to Step S1602.

At Step S1609 the thread for the client receives a command from the viewer 102. If a command arrives, the command is received and passed to a main program of the audio server 506. The main program of the audio server 506 receives the command at Step S1602 and the flow advances to Step S1606 for an operation command. An operation of changing settings of audio acquisition, encoding, transmission and the like, is performed and the result (code representative of the operation success or failure) is notified to the thread for the client which received the command request. At Step S1610 the thread for the client sends the result back to the viewer unit 102 of the client. At Step S1605 the main program of the audio server 506 instructs the operation start of the thread for audio acquisition and encoding. Then, at Step S1607, audio data is acquired at a preset time interval by using the audio capture board and converted into compressed data. Next, at Step S1608, the audio server 506 distributes the compressed data to the threads for all clients.

At Step S1611 the thread for each client judges whether a next audio frame transmission request is received from the client viewer 102. If it is judged that there is the next audio frame transmission request command, the compressed data is distributed to the client viewer 102. If the next audio frame transmission request is received from the client viewer 102, the thread for the client sets an audio frame transmission request flag. Generally, the request is sent back in response to reception completion of the compressed audio data at the client viewer 102. Upon reception of a connection termination command from the viewer 102, this command is notified to the main program and the thread itself is terminated at Step S1612.

At Step S1604 among the processes described above, it is judged whether the connection of the client viewer 102 is established through the secure communications using SSL by the user registered as the manager or privileged user. If the communications are not the secure communications, a response code representative of the secure communication request ("secure connection required") is sent back to the request source. If it is confirmed that the control command is sent via the secure communication path by the user registered as the manager or privileged user, the secure communication request ("secure connection required") is issued to all other connected viewers 102, and thereafter paths other than the encryption communication path using SSL is disconnected.

With this arrangement, for the data distribution from the camera server 101 (or network camera) disposed on the network 103, the camera server 101 can automatically start the transition process to the secure communications with the manager or privileged user. Further, this embodiment is characterized in that the control prohibition area is extended to audio distribution, the communications are shifted to the secure communication in response to an audio distribution start even, and the communications with the viewer 102 unable to shift to the secure communications are disconnected.

Accordingly, audio distribution to a particular user is possible and accidents such as tapping can be avoided in advance. According to the embodiment, whether the secure communication path is used is checked when the audio server 506 is connected, and this check may be performed at a different timing. For example, if one camera server 101 (or network camera) has a plurality of audio input systems, it can be conceived easily that the communications are shifted to the secure communications in response to an event of connection to a particular audio input system.

As described above, the camera server 101 can automatically start the transition process to the secure communications (such as encryption communications) in response to an event of a camera control request to the control prohibition area or control prohibited camera. Namely, the camera server 101 can smoothly shift to the secure communications by cooperating with camera control. It is therefore effective in that operation convenience of the privileged user cannot be degraded while the prohibition area is set to general users. Further, if a plurality of image capture apparatus (VB150, wide angle camera combo, etc.) are connected to the same camera server 101, communications can be shifted to the secure communications in the unit of each image capture apparatus. The secure communications can be applied also to audio distribution by the audio server 506 by limiting audio distribution to the manager or privileged user.

The invention is not limited to the system configuration described above, but a network camera may be used in place of the camera server 101.

The function of each process of the above-described embodiments shown in FIGS. 6, 7, 8, 11 and 12 can be realized by making CPU 133 or CPU 153 read a program for realizing each process function from a memory (memories 134 and 154, etc.) and execute the program.

The invention is not limited to the above-described configurations, but all or a portion of each process function shown in FIGS. 6, 7, 8, 11 and 12 may be realized by dedicated hardware. The above-described memory may be a magneto optical disk, a non-volatile memory such as a flash memory, a readable recording medium such as a CD-ROM, a volatile memory other than a RAM or a computer readable and writable recording medium constituted of a combination of these recording media.

Each process may be realized by storing a program realizing each process function shown in FIGS. 6, 7, 8, 11 and 12 in a computer readable recording medium and making a computer system read and execute the program stored in the recording medium. The "computer system" is intended to include an OS and hardware such as peripheral apparatus. Specifically, the scope of the invention also includes the case wherein the functions of each embodiment are realized by writing the program read from the storage medium into a memory of a function expansion board inserted into a computer or of a function expansion unit connected to the computer, and thereafter making a CPU of the function expansion board or function expansion unit execute a portion or the whole of actual processes in accordance with the program.

The "computer readable recording medium" may be a portable medium such as a flexible disk, a magneto optical disk, a ROM and a CD-ROM, or a storage device such as a hard disk installed in a computer system. The "computer readable recording medium" is further intended to include a storage for holding a program during a predetermined period, such as a volatile memory (RAM) in a computer system as a server or client for receiving a program via a communication line of a network such as the Internet, a telephone line and the like.

The program may be transmitted from the computer system storing the program in a storage device or the like to another computer system via a transmission medium or by transmission waves in the transmission medium. The "transmission medium" for transmitting a program is a medium having a function of transmitting information, such as a network such as the Internet and a communication line such as a telephone line.

The program may realize a portion of the above-described embodiment function. The program may be software capable of realizing the above-described embodiment function by a combination of a program already stored in the computer system, i.e., a so-called difference file (difference program).

A program product such as a computer readable recording medium recording the program may be applied to an embodiment of the present invention. The scope of the present invention includes the program, recording medium, transmission medium and program product.

The embodiments of the present invention has been described in detail with reference to the accompanying drawings. Specific structures are not limited to the embodiments, but various designs and the like are also possible without departing from the features of the present invention.

The present invention has been described with reference to preferred embodiments. The present invention is not limited to the above-described embodiments, but various modifications are possible within the scope described in the claims.

This application claims priority from Japanese Patent Application No. 2005-033958 filed Feb. 10, 2005, which is hereby incorporated by reference herein.

What is claimed is:

1. An information processing apparatus for distributing an image photographed with an image capture apparatus to a plurality of terminals on a network, the information processing apparatus comprising:

an apparatus control unit for controlling an image capture range of said image capture apparatus in accordance with an instruction from one of the plurality of terminals requesting for distribution of said image;

a storage unit for storing image capture limitation information defining an image capture limitation area; and a communication control unit for controlling communications with a terminal other than said one of said plurality of terminals so as to switch to communication via a secure communication path if it is judged from said image capture limitation information stored in said storage unit that the image capture range after control by said apparatus control unit includes the limitation area and if it is judged that the instruction from said one of said plurality of terminals is received via a secure communication path, wherein said apparatus control unit avoids controlling the image capture range of said image capture apparatus corresponding to the instruction from said one of said plurality of terminals if it is judged from said image capture limitation information stored in said storage unit that the image capture range after control by said apparatus control unit includes the limitation area and if it is judged that the instruction from said one of said plurality of terminals is not received via a secure communication path.

2. An information processing method for an information processing apparatus for distributing an image photographed with an image capture apparatus to a plurality of terminals on a network, the information processing method comprising:

an apparatus control step of controlling an image capture range of said image capture apparatus in accordance with an instruction from one of said plurality of terminals requesting for distribution of said image;

a first judgment step of referring to image capture limitation information which is stored in a storage unit and defines an image capture limitation area, and judging whether or not said image capture range after control by said apparatus control step includes said limitation area;

a second judgment step of judging whether or not the instruction from said one of said plurality of terminals is received via a secure communication path; and a communication control step of controlling communications with said a terminal other than said one of said plurality of terminals so as to switch to communication via a secure communication path if said first judgment step judges that said image capture range after control by said apparatus control step includes said limitation area and if said second judgment step judges that the instruction from said one of said plurality of terminals is received via a secure communication path, wherein said apparatus control step avoids controlling the image capture range of said image capture apparatus corresponding to the instruction from said one of said plurality of terminals if said first judgment step judges that said image capture range after control by said apparatus control step includes said limitation area and if said second judgment step judges that the instruction from said one of said plurality of terminals is not received via a secure communication path.

3. A non-transitory storage medium storing a computer-readable program comprising a program code for causing a computer to execute the image processing method set out in claim 2.

* * * * *